United States Patent Office 3,330,054
Patented July 11, 1967

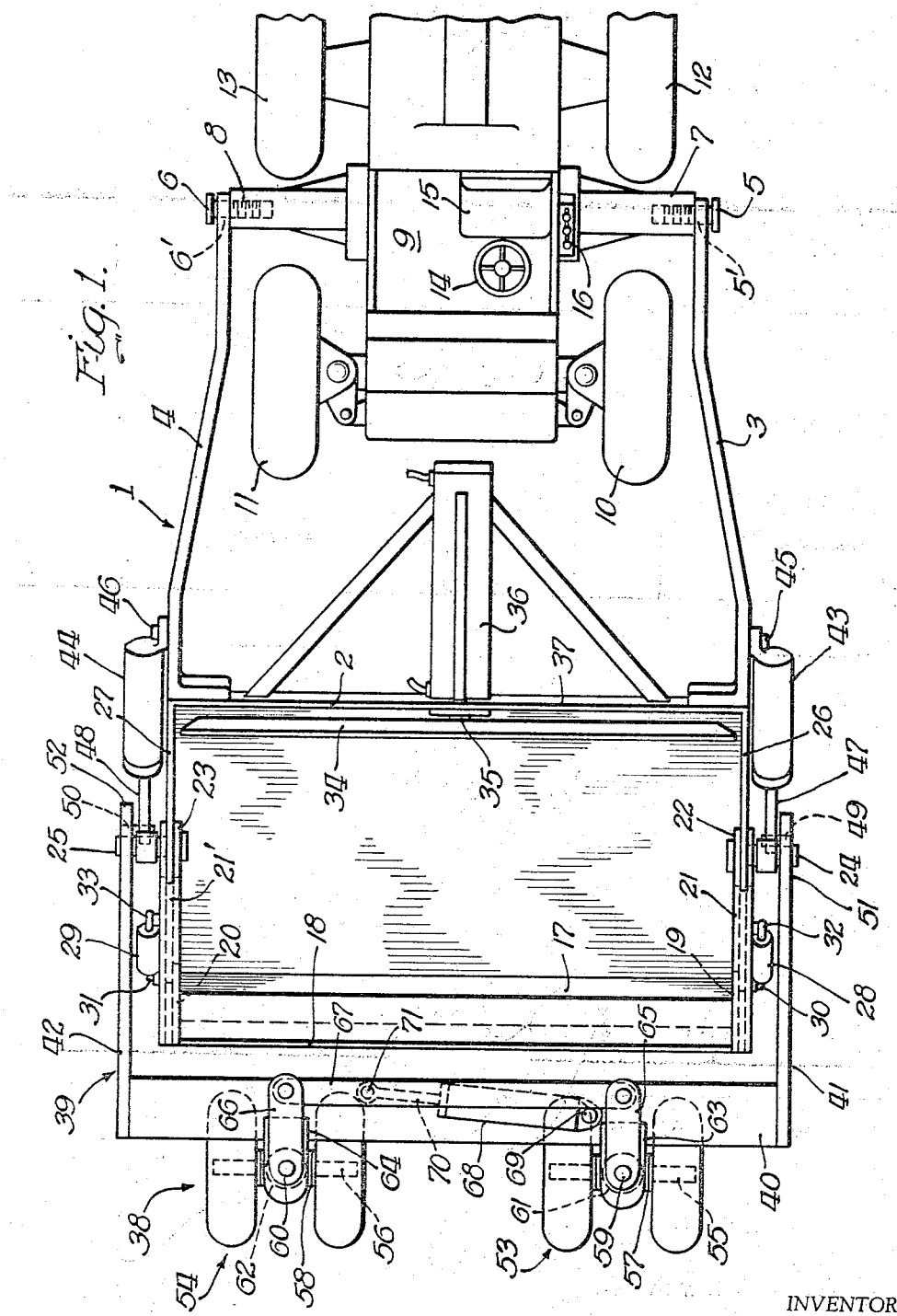

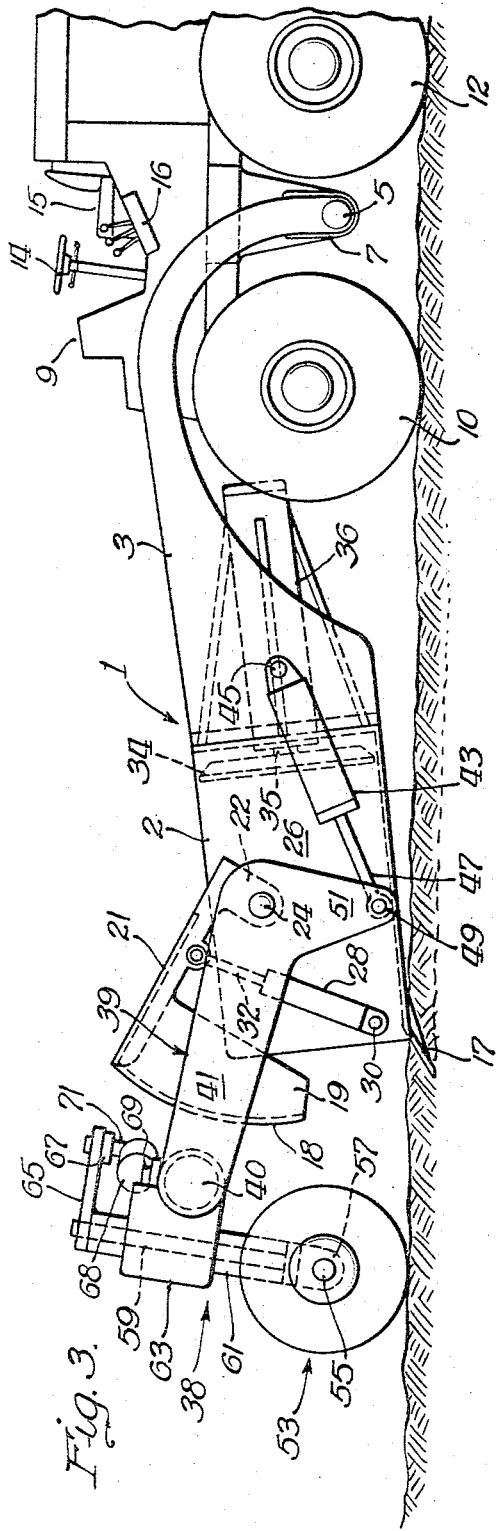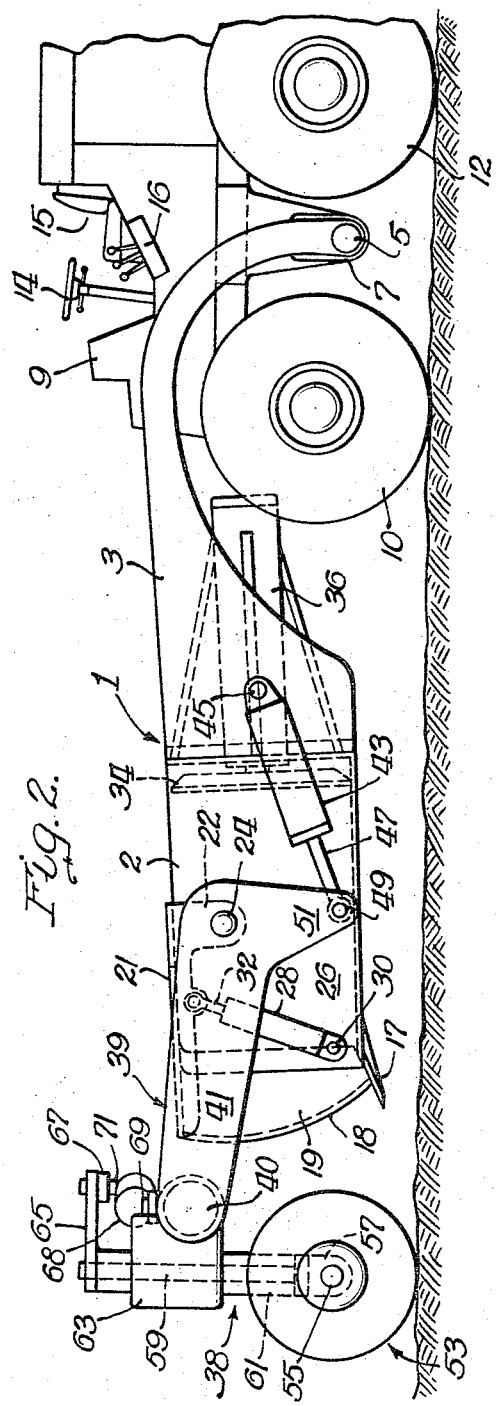

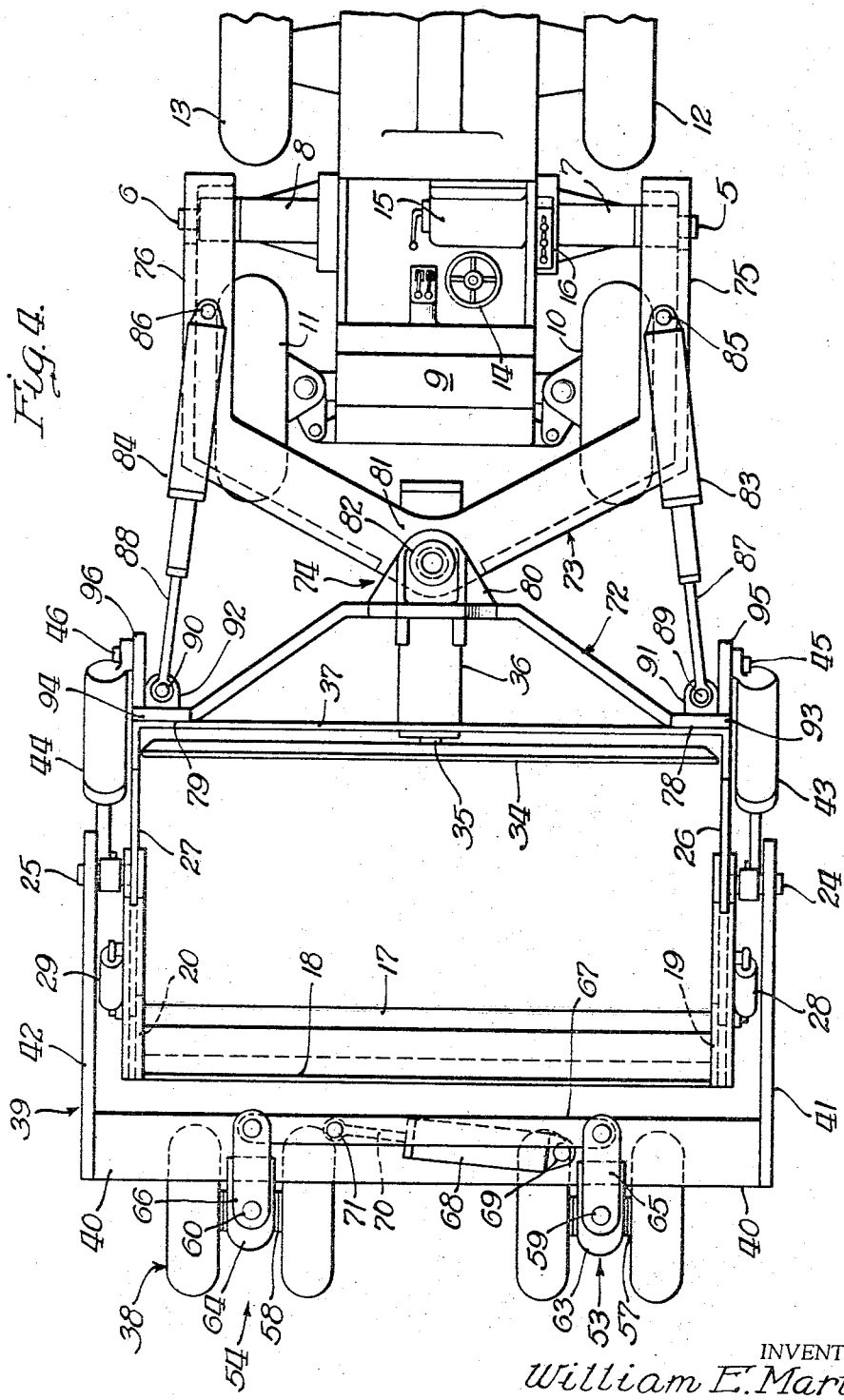

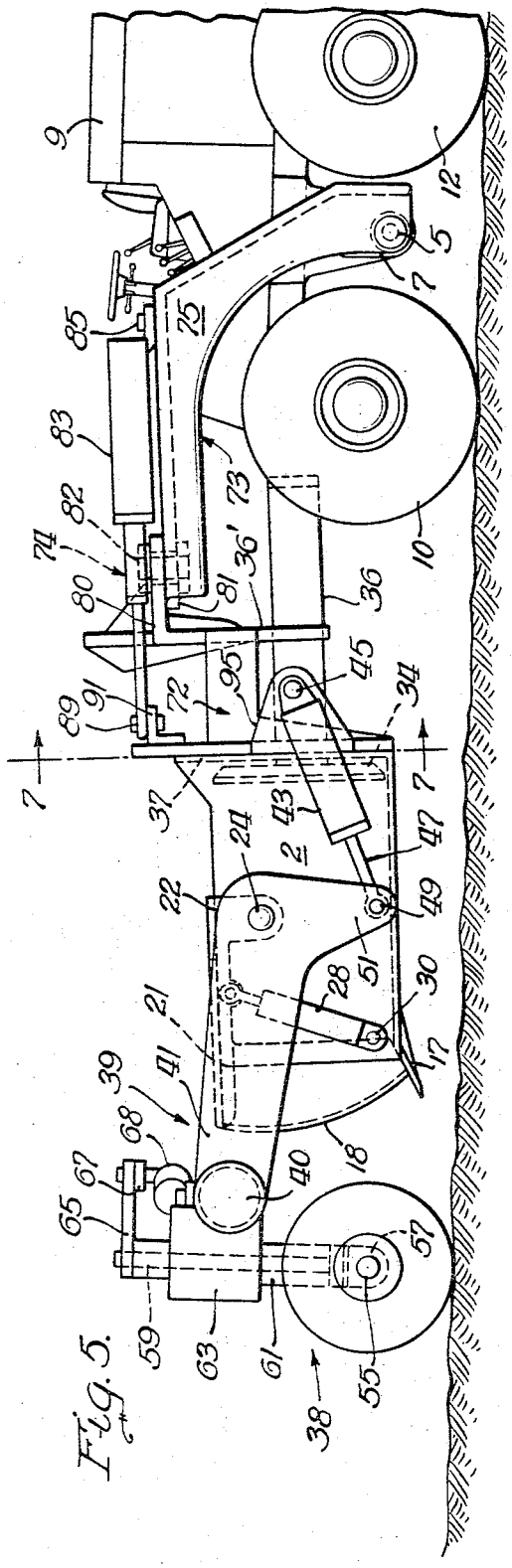
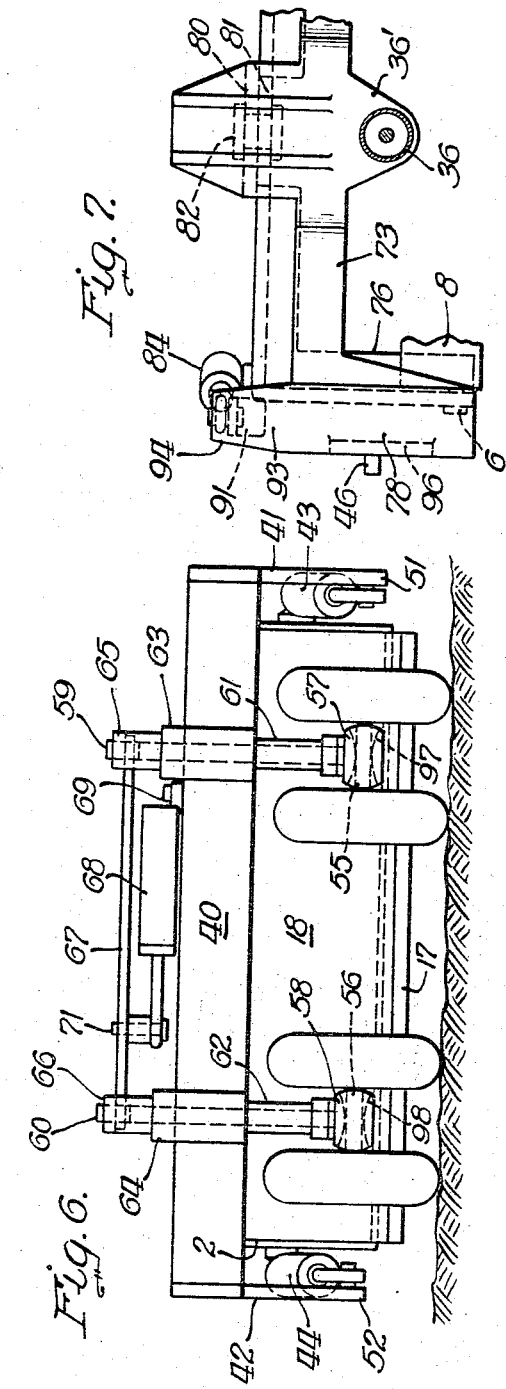

3,330,054
REAR MOUNTED PUSH OPERATED MATERIAL MOVING SCOOP TYPE ROAD SCRAPER
William E. Martin, % Martin Company,
P.O. Box 187, Kewanee, Ill. 61443
Filed Dec. 17, 1964, Ser. No. 419,007
10 Claims. (Cl. 37—124)

This invention relates to a material carrying scoop type scraper devised for pivotal attachment ahead of a conventional power tractor to be push loaded in advance of the power unit under control of an operator seated on the power unit and which is regulated through the hydraulic control system of the power unit connected with the hydraulic means that manipulate the road scraper mechanical systems.

More specifically, the invention provides a road working attachment of a scoop type road scraper constructed as a scoop and a scoop carrying frame combination which attaches for rockable movement at one end to the power vehicle and wherein a wheeled assembly supports the outer forward end of the scoop and its integral framework through a hydraulically operated mechanism that raises and lowers the scoop unit in relation to the power vehicle and with respect to the wheeled assembly, the road and to the ground level being worked on by this combination mobile machine.

An object of this invention is to provide a scoop type road scraper for vertically swingable attachment with a power tractor for operative manipulation as an integral self-contained machine that carries out its respective road working functions entirely in advance of the power tractor and which is controlled from the power tractor.

Another object is to establish the scoop of the road working scraper as a unitary part of a framework that is releasably and movably supported on trunnioin members supplied by the power tractor for the reception of various kinds of equipment.

Another object is to provide a material handling scoop of the character above mentioned which is raised and lowered to carry out its various functions by the cooperative action of a wheeled assembly disposed ahead of the scoop-frame structure and the pivotal mounting means on the frame and/or on the power vehicle trunnions, with the intermediate action of a hydraulic mechanism spanning the space between said wheeled assembly and the scoop-frame structure to regulate the scoop per se.

The hydraulic mechanism comprises an operative scoop-frame forward support means as well as a means whereby to steer the front end of the scoop-frame structure through the steering action of the forward wheel assembly.

A further object is to provide an articulate scoop-frame structure that supplies a pivotal connection intermediate the location of the frame connection with the power tractor trunnions and the scoop location to provide a more maneuverable and more flexible manipulatory scoop arrangement of the character herein employed when attached to the power tractor to form a tandem mobile machine for earth working purposes and for transport purposes.

As an added object the articulate scoop-frame structure includes hydraulic means to regulate the portions of the earth moving machine to the fore and aft of the point of articulation. With this arrangement an operator on the power tractor can control the forward wheel assembly and the intermediate angular positions of the articulate scoop-frame plus the steering of the power unit to increase the flexibility of operation of the combined unit and to make relatively sharp turns when required or necessary under operation.

In the present construction, the scoop incorporates a hydraulically actuated material ejector and a swingable closure hood at its open end whereby the scoop material can be discharged in controlled amounts where and as required by conditions of operation. Loading of the scoop is brought about with the hood raised and ejector retracted.

Other objects and advantages of this pusher type scoop loader attachment shall hereinafter appear in or become evident from the following detailed description having reference to the accompanying drawings forming a part of this specification.

In the drawings:

FIG. 1 is a top plan view of the scoop-frame earth moving loader of the present invention which is operatively connected with a power tractor for earth moving operation ahead of and for manipulation in advance of the power unit shown;

FIG. 2 is a side elevational view of the same with the scoop illustrated in a raised material carrying or transport position;

FIG. 3 is like FIG. 2 above, but with the scoop shown in a lowered material loading position;

FIG. 4 is a top plan view of the scoop-frame earth moving loader of the articulate construction which generally follows the FIG. 1 device except that a pivotal connection is interposed between the scoop location and the power tractor;

FIG. 5 is a side elevational view of the articulate scoop-frame arrangement of FIG. 4 with the scoop shown in raised transport position;

FIG. 6 is a front elevational view of the FIG. 4 construction; and

FIG. 7 is a fragmentary detailed view of the structure as seen to the right of the section line 7—7 in FIG. 5.

In FIGS. 1 to 3, the scoop-frame structure 1 is defined by the scoop 2 and its rearwardly projecting frame sections 3 and 4 that are pivotally mounted on stub shafts 5 and 6 carried by trunnion units 7 and 8 which constitute parts of the power tractor 9. The power tractor is here shown as a conventional type with steerable front wheels 10 and 11, rear wheels 12 and 13, steering wheel 14, seat 15, and being provided with a power operated hydraulic system having controls such as 16 near the operator's location.

It is to be understood that suitable hydraulic hookups are used to connect the various hydraulic cylinders and mechanisms with the hydraulic system of the power tractor. These hydraulic lines have been omitted for the sake of clarity and to better emphasize the salient features and structures of this invention.

It is also to be noted that the pivotal union of the scoop-frame with the trunnion or support members of the power tractor may be carried out by means of various conventional pivotal assemblies even though this mounting connection is shown diagrammatically in the drawings. Frame sections 3 and 4 are illustrated as having openings 5' and 6' to receive the stub shaft means 5 and 6. The latter are for purposes of assembly removably connected with the trunnions 7 and 8 as shown in FIG. 1 by way of one example of a pivotal means for the scoop-frame structure for the movable union of the frame parts with the power vehicle. Thus for purposes of defining a pivotal means at the attachment sites discussed, pivotal means refers to the type of connection used for the frame mounts at the trunnion locations and may readily form a part of the two frame sides 3 and 4 and/or a part of the power tractor.

The scoop 2 is constructed with a forward cutting edge blade 17 to guide material into the scoop and the forward open end of the scoop is equipped with a closure hood 18 having side baffles 19 and 20 adjacent the scoop walls to complete the scoop closure when the hood is in closed lowered position. Arms 21 and 21' carry the hood 18 and have depending brackets 22 and 23 that are pivotally mounted on stub shafts 24 and 25 that are fixedly secured to and carried by the side walls 26 and 27 of the scoop 2. Power cylinders 28 and 29 are pivoted on studs 30 and 31 on the scoop sides 26 and 27 and the piston rods 32 and 33 are pivotally joined with the hood arms 21 and 21' respectively to provide the means to raise and lower the hood 18 as needed under scoop operation.

In addition, scoop 2 is equipped with an ejector 34 which is moved by means of the piston rod 35 of the hydraulic cylinder 36 which is suitably mounted on the rear wall structure 37 of the scoop 2.

As described, the scoop is vertically bodily swingably supported through the frame sections 3 and 4 on the power tractor trunnions 7 and 8 as previously explained. The forward end of the scoop 2 is mounted upon a wheeled assembly 38 through a raising and lowering mechanism 39 that regulates the vertical positions of the scoop according to the operator's regulation on the power tractor.

The scoop raising and lowering mechanism 39 comprises a transverse cross tube 40 having bell crank side arms 41 and 42 that straddle the sides 26 and 27 of scoop 2 for pivotal mounted connection on stub shafts 24 and 25 of the scoop. Power cylinders 43 and 44 are pivotally mounted on the frame sections 3 and 4 at 45 and 46, while the cylinder rods 47 and 48 are pivotally joined at 49 and 50 with the depending legs 51 and 52 of the bell crank arms 41 and 42 respectively.

The wheeled assembly 38 comprises twin wheel sets 53 and 54 each having axles 55 and 56 in journal members 57 and 58 that are connected with steering posts 59 and 60. The posts are journalled in standards 61 and 62 fixedly depending from t pair of bearing bosses 63 and 64 that are fixedly connected with the cross tube 40 of the raising and lowering mechanism 39. Posts 59 and 60 are equipped with cranks 65 and 66 connected by a drag link 67 and a power cylinder 68 is pivotally mounted at 69 on the cross tube 40 with the cylinder rod 70 pivotally connected at 71 with the link 67 for steering operation of the twin wheel sets 53 and 54 by the power cylinder mechanism described.

Thus with the combined action of cylinders 43 and 44 on the mechanism 39 about pivots 24 and 25, and through the rocking of the twin wheel sets 53 and 54 of the wheel assembly 38, the vertical position of scoop 2 is raised and lowered about the support points defined by shafts 5 and 6 on the power vehicle 9.

And by means of the steerable power vehicle wheels 10 and 11, and the twin sets of wheels 53 and 54 of the wheel assembly 38, the scoop-frame can be easily maneuvered over the road surface using both the front and rear steerable wheel means together or individually as the case may be to meet conditions of operation.

In the construction shown in FIGS. 4 to 7, the same reference numerals will be applied for the structural units and parts that are common to both forms of the invention.

In this second construction, the scoop-frame assembly is an articulate unit which includes a pivotal connection in the frame section portion of the road scraper as is well shown in FIG. 4, this frame section being the structure that mounts the scoop per se on the pivotal trunnion units of the power vehicle.

The frame portion of this construction comprises a scoop frame 72 and a coacting mounting frame 73 pivotally joined by the pivotal means 74. In FIG. 4 the mounting frame 73 diverges rearwardly and provides spaced bracket sections 75 and 76 that pivotally mount upon the aligned mounting shafts 5 and 6 of the trunnions 7 and 8 of the power tractor 9. The scoop-frame 72 as seen in FIG. 4 diverges forwardly into vertical base plate sections 78 and 79 that are suitably secured to the rear wall 37 of the scoop 2 by means of welding, or if desired through the use of bolt and nut means. Frame 72 has a depending member 36' to hold cylinder 36 in outboard relation to scoop wall 37.

It should also be noted that frame 72 is provided with a horizontal bearing plate 80 that rests on the flat bearing surface on top of part 81 of frame 73 and the pivotal unit 82 holds these bearing means in engaged position to keep frames 72 and 73 horizontally aligned, but permitting relative laterally swinging movement between the frames 72 and 73. Thus the raising and lowering of scoop 2 is accomplished in the same manner as in the FIG. 1 construction.

The relative angularity between the frame sections 72 and 73 is controlled by the operator by means of power cylinders 83 and 84. These cylinders are pivotally connected at 85 and 86 at the upper surface portions of bracket section 75 and 76, and the cylinder rods 87 and 88 of these cylinders are pivotally joined at 89 and 90 with mounting ears 91 and 92 secured to upstanding plates 93 and 94 provided as continuations of the base plate sections 78 and 79 of the scoop-frame 72.

It is to be understood that cylinders 83 and 84 are double acting and oppositely operable so that one cylinder will retract while the other expands to obtain the relative angular positioning of frames 72 and 73 either to the left or to the right as viewed from the operator's seat. Suitable valve means can readily be employed to carry out this function of the articulate frame sections. If desired under certain conditions of operation, it is also possible to render the cylinders 83 and 84 inactive to any fluid pressure through suitable bypass means so that the articulation of the frame sections 72 and 73 is uncontrolled and will thus be entirely subject to the steering actions of the power tractor wheels 12 and 13 and to the positions assumed by the forward twin wheel sets 53 and 54. This all adds to the versatility of maneuvering the combined vehicle described and enhances its use in road working procedures.

In the construction described, the cylinders 43 and 44 connect with pivotal means 45 and 46 which are mounted on rearwardly disposed flanges 95 and 96 extending from adjacent the scoop portion of the frame section 72.

In FIG. 6 it should be observed that the axles 55 and 56 are carried in oppositely outwardly flared vertical slotted openings 97 and 98 located in the wheel journal members 57 and 58 to provide limited rocking of the twin wheel sets 53 and 54 in lateral planes. This same construction is also used in the twin wheel sets that are employed in the construction of the road scraper which is illustrated in FIGS. 1 to 3 to provide more flexible road contact of the individual wheels of the wheel sets during road working conditions.

The foregoing description has been directed to certain forms of the invention and to preferred structures disclosed by way of examples as suggested means to carry out the principles herein involved. The invention is not, however, to be limited to the disclosures made and certain changes in the combinations shown or in the individual elements are contemplated to the extent that they shall be governed by the breadth and scope of the hereinafter claimed subject matter.

What is claimed is:

1. A push type road scraper adapted for releasable attachment as an accessory unit with an independent power tractor for operative material handling in an area ahead of and forwardly beyond the power tractor comprising a material carrying scoop with a material cutting and loading blade secured thereto, an ejector within said scoop, a scoop frame fixedly connected with said scoop and extending rearwardly therefrom including attachment means for connection with said power tractor to support the rear portion of the scoop upon said power tractor for bodily vertically swinging of said scoop and blade between loading and transport positions, a wheel assembly disposed ahead of said scoop, and a raising and lowering mechanism connected with the scoop and with the wheel assembly to provide means to raise and lower said scoop and its blade in relation to the underlying surface, said wheels of said assembly supporting said scoop in forwardly spaced relation with respect to the scoop frame support locations on the power tractor, said scoop frame comprising a divided frame providing a first frame section on said scoop and a second companion attachment frame section that connects with said power tractor, pivotal means defining a pivot axis interconnecting said two companion frame sections to permit relative lateral articulation of the frame sections between said scoop and said power tractor, and ejector actuating mechanism having an axis intersecting the axis of said pivotal means.

2. A push type road scraper adapted for releasable attachment as an accessory unit with an independent power tractor for operative material handling in an area ahead of and forwardly beyond the power tractor comprising a material carrying scoop with a material cutting and loading blade secured thereto, an ejector within said scoop, a scoop frame fixedly connected with said scoop and extending rearwardly therefrom including attachment means for connection with said power tractor to support the rear portion of the scoop upon said power tractor for bodily vertically swinging of said scoop and blade between loading and transport positions, a wheel assembly disposed ahead of said scoop, and a raising and lowering mechanism connected with the scoop and with the wheel assembly to provide means to raise and lower said scoop and its blade in relation to the underlying surface, said wheels of said assembly supporting said scoop in forwardly spaced relation with respect to the scoop frame support locations on the power tractor, said scoop frame comprising a divided frame providing a first frame section on said scoop and a second companion attachment frame section that connects with said power tractor, pivotal means defining a pivot axis interconnecting said two companion frame sections to permit relative lateral articulation of the frame sections between said scoop and said power tractor, ejector actuating mechanism having an axis intersecting the axis of said pivotal means, and said articulated frame sections including power operated mechanisms connected between said frame sections to operatively regulate the desired amount of angularity between said respective companion frame sections under operative working conditions.

3. A push operated road scraper adapted for releasable attachment with a power tractor comprising a material handling scoop with a fixed material loading cutting blade thereon, an ejector within said scoop, a mobile assembly to support the scoop at one location, support mechanism mounted on said mobile assembly and connected with said scoop including actuating mechanism to raise and lower the scoop and its fixed blade in relation to the ground, and a frame structure on said scoop arranged for attachment with said power tractor comprising a scoop frame section on said scoop and a cooperative companion attachment frame section to connect with said power tractor, pivotal means defining a pivot axis interconnecting said frame sections to permit relative lateral angling between said frame sections ahead of said power tractor for greater maneuverability, ejector actuating mechanism having an axis intersecting the axis of said pivotal means, and said mobile assembly including steerable wheel means to control the relative positions of the scoop and its scoop frame section in relation to the cooperative companion attachment frame section connected with the power tractor.

4. A push rod operated road scraper adapted for releasable attachment with a power tractor comprising a material handling scoop with a fixed material loading cutting blade thereon, an ejector within said scoop, a mobile assembly to support the scoop at one location, support mechanism mounted on said mobile assembly and connected with said scoop including actuating mechanism to raise and lower the scoop and its fixed blade in relation to the ground, and a frame structure on said scoop arranged for attachment with said power tractor comprising a scoop frame section on said scoop and a cooperative companion attachment frame section to connect with said power tractor, pivotal means defining a pivot axis interconnecting said frame section to permit relative lateral angling between said frame sections ahead of said power tractor for greater maneuverability, ejector actuating mechanism having an axis intersecting the axis of said pivotal means, and said mobile assembly including steerable wheel means to control the relative positions of the scoop and its scoop frame section in relation to the cooperative companion attachment frame section connected with the power tractor, said pivotally joined frame sections including laterally spaced power operated control mechanisms connected therebetween to regulate the relative angularity of said frame sections with respect to each other under active operation.

5. A push operated road scraper adapted for releasable attachment with a power tractor comprising a material handling scoop with a fixed material loading cutting blade thereon, an ejector within said scoop, a mobile assembly to support the scoop at one location, support mechanism mounted on said mobile assembly and connected with said scoop including actuating mechanism to raise and lower the scoop and its fixed blade in relation to the ground, and a frame structure on said scoop arranged for attachment with said power tractor comprising a scoop frame section on said scoop and a cooperative companion attachment frame section to connect with said power tractor, pivotal means defining a pivot axis interconnecting said frame sections to permit relative lateral angling between said frame sections ahead of said power tractor for greater maneuverability, ejector actuating mechanism having an axis intersecting the axis of said pivotal means, and said mobile assembly including steerable wheel means to control the relative positions of the scoop and its scoop frame section in relation to the cooperative companion attachment frame section connected with the power tractor, said pivotal means comprising superimposed horizontally arranged coacting overlapping bearing plate members on said companion frame sections respectively bisected by a vertically disposed pivot element to hold said sections together in operative positions and for the articulation of said frame section.

6. A push type road scraper comprising, in combination, a material handling scoop having an integral loading blade, a rear frame structure integral with said scoop including attachment means to releasably connect said scoop at a given elevation with a power driven vehicle for bodily swinging movement between loading and transport positions, a wheel assembly for said scoop including a rockable framework on wheels, pivot members on said scoop sides, said framework having a cross tube provided with arm members pivotally mounted on said scoop side pivot members, said cross tube being rigidly mounted for support on said rockable framework of the wheel assembly, and actuating means carried by said scoop and operatively connected with said arm members to rock the same and the cross tube of said rockable framework upon said pivot members to raise and lower the scoop and its loading blade between the wheel assembly and the frame connection of the scoop on the power driven vehicle.

7. A push type road scraper comprising, in combination, a material handling scoop having an integral loading blade, a rear frame structure integral with said scoop including attachment means to releasably connect said scoop at a given elevation with a power driven vehicle for bodily swinging movement between loading and transport positions, a wheel assembly for said scoop including a rockable framework on wheels, pivot members on said scoop sides, said framework having a cross tube provided with arm members pivotally mounted on said scoop side pivot members, said cross tube being rigidly mounted for support on said rockable framework of the wheel assembly, and actuating means carried by said scoop and operatively connected with said arm members to rock the same and the cross tube of said rockable framework upon said pivot members to raise and lower the scoop and its loading blade between the wheel assembly and the frame connection of the scoop on the power driven vehicle, said rear frame structure comprising two pivotally connected coactive companion frame sections to provide articulation of said sections at a point intermediate the scoop and the attachment means, and said wheel assembly including steerable mechanism to selectively maneuver the head end of the scoop under operation.

8. A push type road scraper comprising, in combination, a material handling scoop having an integral loading blade, a rear frame structure integral with said scoop including attachment means to releasably connect said scoop at a given elevation with a power driven vehicle for bodily swinging movement between loading and transport positions, a wheel assembly for said scoop including a rockable framework on wheels, pivot members on said scoop sides, said framework having a cross tube provided with arm members pivotally mounted on said scoop side pivot members, said cross tube being rigidly mounted for support on said rockable framework of the wheel assembly, and actuating means carried by said scoop and operatively connected with said arm members to rock the same and the cross tube of said rockable framework upon said pivot members to raise and lower the scoop and its loading blade between the wheel assembly and the frame connection of the scoop on the power driven vehicle, said frame structure comprising two pivotally connected frame sections to provide articulation of said sections at a point intermediate the scoop and the attachment means, and said wheel assembly including steerable mechanism to selectively maneuver the head end of the scoop under operation, said pivotally connected frame sections including power cylinders connected therebetween in locations on opposite sides of the pivotal connection between the frame sections to regulate and control the desired allowable amount of articulation required between these two frame sections to carry out a predetermined maneuver.

9. An accessory road scraper for attachment with a power vehicle to be push operated thereby comprising a scoop with a fixed loading edge, a frame integral therewith including attachment units to connect at a given elevation with trunnion members on said power vehicle, a wheeled assembly including fixed structural apparatus thereon having spaced arms to straddle the opposite outward sides of said scoop, pivotal means on the scoop sides to rockably support said arms respectively, said arms having angularly arranged leg portions disposed radially to the axes of said pivotal means, and hydraulic cylinders operatively connected and interposed between said scoop sides and said angular leg portions to swing the latter to raise and lower the wheel assembly ends of said arms whereby to raise and lower said scoop and its loading edge by means of the pivotal means thereon, said structural apparatus of said wheel assembly being bodily tilted fore and aft on said wheeled assembly under the motion of the arms by said hydraulic cylinders.

10. An accessory road scraper for attachment with a power vehicle to be push operated thereby comprising a scoop with a fixed loading edge, a frame integral therewith including attachment units to connect at a given elevation with trunnion members on said power vehicle, a wheeled assembly including fixed structural apparatus thereon having spaced arms to straddle the opposite outward sides of said scoop, pivotal means on the scoop sides to rockably support said arms respectively, said arms having angularly arranged leg portions disposed radially to the axes of said pivotal means, and hydraulic cylinders operatively connected and interposed between said scoop sides and said angular leg portions to swing the latter to raise and lower the wheel assembly ends of said arms whereby to raise and lower said scoop and its loading edge by means of the pivotal means thereon, said structural apparatus of said wheel assembly being bodily tilted fore and aft on said wheeled assembly under the motion of the arms by said hydraulic cylinders, said wheel assembly having steerable wheel units thereon to manuever the forward end of the scoop by means of said arms, and said integral frame being divided into cooperative companion parts that are pivotally connected for articulation in the area between the scoop and the connections of said attachment units on said power vehicle trunnions to increase and enhance the maneuverability of the rear portion of said scoop.

References Cited

UNITED STATES PATENTS

| | | | |
|---|---|---|---|
| 2,061,924 | 11/1936 | Slate | 37—129 |
| 2,252,763 | 8/1941 | French | 37—126 |
| 2,284,412 | 5/1942 | Frentzel et al. | 37—126 |
| 2,682,120 | 6/1954 | Wirkala | 37—126 |
| 3,074,190 | 1/1963 | Wahl | 37—117.5 |

ABRAHAM G. STONE, *Primary Examiner.*

A. E. KOPECKI, *Assistant Examiner.*